May 29, 1951 — O. E. WOLFF — 2,554,889
PHOTOGRAPHIC PRODUCT AND APPARATUS
Filed April 12, 1947 — 3 Sheets-Sheet 1

FIG. 1

May 29, 1951 O. E. WOLFF 2,554,889
PHOTOGRAPHIC PRODUCT AND APPARATUS
Filed April 12, 1947 3 Sheets-Sheet 2

FIG. 2

INVENTOR
Otto E. Wolff
BY Donald L. Brown
and Oliver W. Hayes
Attorneys

May 29, 1951 O. E. WOLFF 2,554,889
PHOTOGRAPHIC PRODUCT AND APPARATUS
Filed April 12, 1947 3 Sheets-Sheet 3

INVENTOR
Otto E. Wolff
BY Donald L. Brown
and Oliver F. Hayes
Attorneys

Patented May 29, 1951

2,554,889

UNITED STATES PATENT OFFICE 2,554,889

PHOTOGRAPHIC PRODUCT AND APPARATUS

Otto E. Wolff, Cambridge, Mass., assignor to Polaroid Corporation, Cambridge, Mass., a corporation of Delaware Application April 12, 1947, Serial No. 741,070

18 Claims. (Cl. 95—13)

This invention relates to photography and more particularly to novel photographic products, camera apparatus, and attachments for cameras.

A principal object of the present invention is to provide improved processing means for use in a magazine, camera, or camera attachment, of the type wherein a photographic film unit, containing a liquid, is adapted to be processed by the application of a mechanical stress thereto for the purpose of releasing and spreading said liquid throughout a predetermined area of said film unit.

Another object of the present invention is to provide such a release and spreading means which is particularly suited to volume production and is easy to install in its operative association with a magazine or camera, and which is disposable after use.

Another object of the present invention is to provide a novel release and spreading means which can be made to close tolerances and is capable of creating accurate spreading of predetermined thicknesses of said liquid.

Another object of the invention is to provide a novel product comprising a plurality of liquid-containing film units, and processing means associated therewith.

Another object of the invention is to provide a camera apparatus or attachment particularly suited for use with the novel product of the present invention.

These and other objects of the invention will in part be obvious and will in part appear hereinafter.

The invention accordingly comprises the product possessing the features, properties and the relation of components and the apparatus possessing the construction, combination of elements and arrangement of parts which are exemplified in the following detailed disclosure, and the scope of the application of which will be indicated in the claims:

For a fuller understanding of the nature and objects of the invention, reference should be had to the following detailed description taken in connection with the accompanying drawings wherein.

In general this invention relates to an improved product comprising means for processing a photographic film unit by releasing and spreading a releasable processing liquid contained therewithin, and to camera apparatus for use therewith. With such film units, the liquid is preferably held in a container therefor and the processing means releases and spreads the liquid in a predetermined layer throughout a predetermined area of said film unit, wipes excess liquid from the sides and ends of the film unit, and traps the excess liquid. The means may also serve an additional function of acting as a light seal for a housing containing said means.

In a preferred form of the invention there are a plurality of these processing means which are so related to a housing for a plurality of liquid-containing film units that these means define a plurality of withdrawal openings for removal of the film units, these means acting to process the film units as they are withdrawn from the housing. The novel product of the invention preferably comprises a combination of a plurality of such film units and processing means, while the housing is preferably a part of a camera or attachment thereto. A preferred form of processing means comprises a pair of coacting members, at least one of said members having a blade-like portion. The members are preferably identical and each member preferably comprises several blades resiliently mounted with respect to each other. The blades of the member are preferably integral and formed in a V-shape. The apex of the V is toward the interior of the housing and the arms of the V extend outwardly from the housing. One arm of the V is preferably substantially parallel to the withdrawal plane of a film unit while the other arm may have an angular relation with respect to the first arm which varies from approximately 1° to as high as about 70°. With such an arrangement, a plurality of such members may be placed in a stack adjacent the withdrawal path of the film units. A pair of these members thus defines an elongated withdrawal opening. The angular arm of one member coacts with the parallel arm of an adjacent member to form a resilient opening. It is preferred that these members have a low spring rate, i. e., one of about 100 to 200 pounds per inch.

Such members give excellent releasing and spreading characteristics when used with film units of the general type described above.

Figure 1:
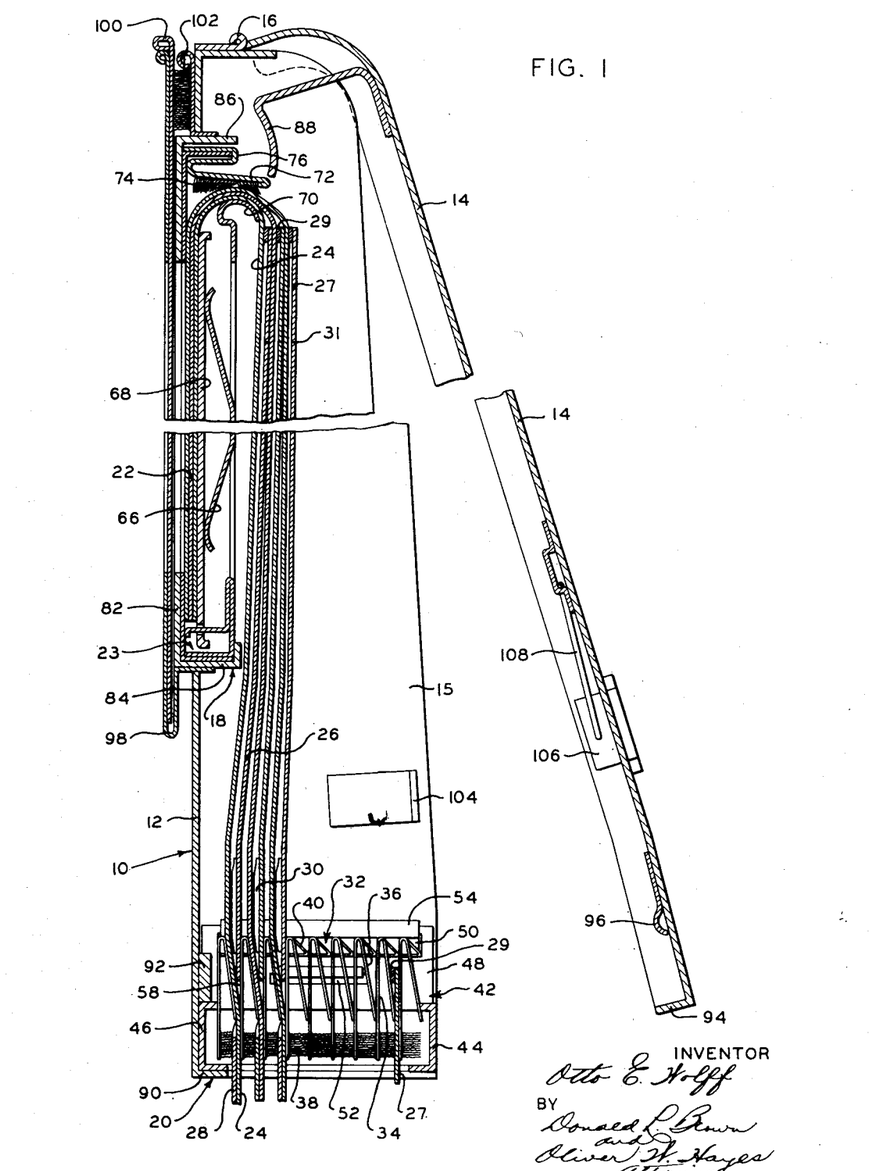
Figure 1 is a diagrammatic fragmentary cross-sectional view of one form of the present invention in its operative relationship to a housing therefor.

Referring now to Fig. 1, there is shown a preferred modification of the present invention in relationship to a housing therefor. As shown in Fig. 1, there is provided a novel housing generally indicated at 10, adapted to hold a plurality of film units and processing means. This housing is shown in the form of an attachment to be applied to a standard film pack camera. The housing 10 comprises a front wall 12, side walls 15, and a back cover wall 14 suitably pivoted to the front wall as as 16. In the front wall of the housing there is provided a portion thereof so designed as to receive a film pack containing a plurality of photosensitive layers. This portion is generally indicated at 18 and is adapted to hold the foremost photosensitive layer of the pack in the focal plane of a camera. Another portion of the housing is adapted to receive and hold a plurality of the novel processing means in operative relationship to the various elements with which these processing means are to be used. This latter portion of the housing is generally indicated at 20.

Figure 2:
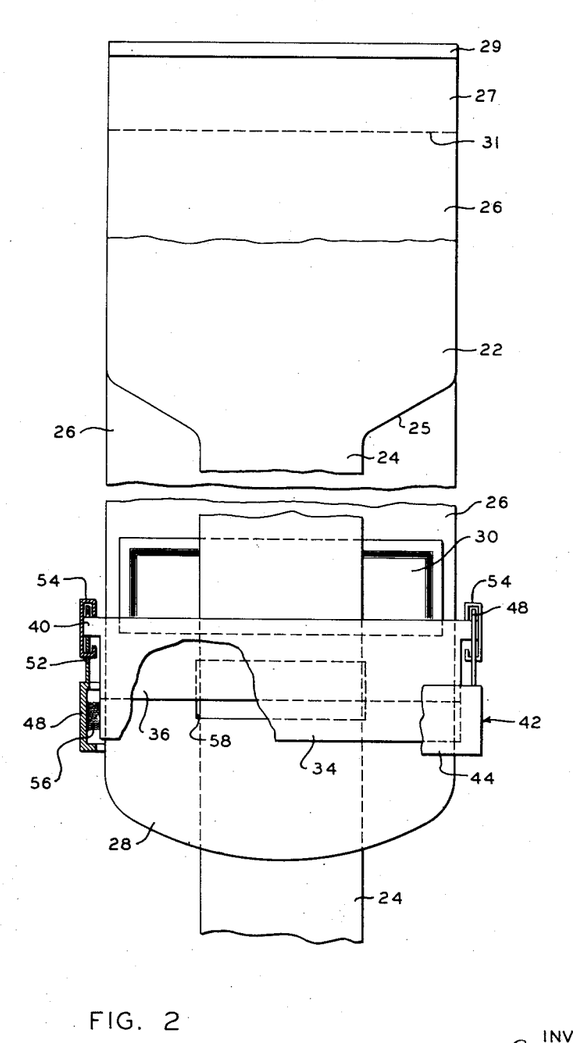
Fig. 2 is a diagrammatic fragmentary plan view of one of the film units of the present invention showing its relation to a processing means, this processing means being partially cut away.
Figure 3:
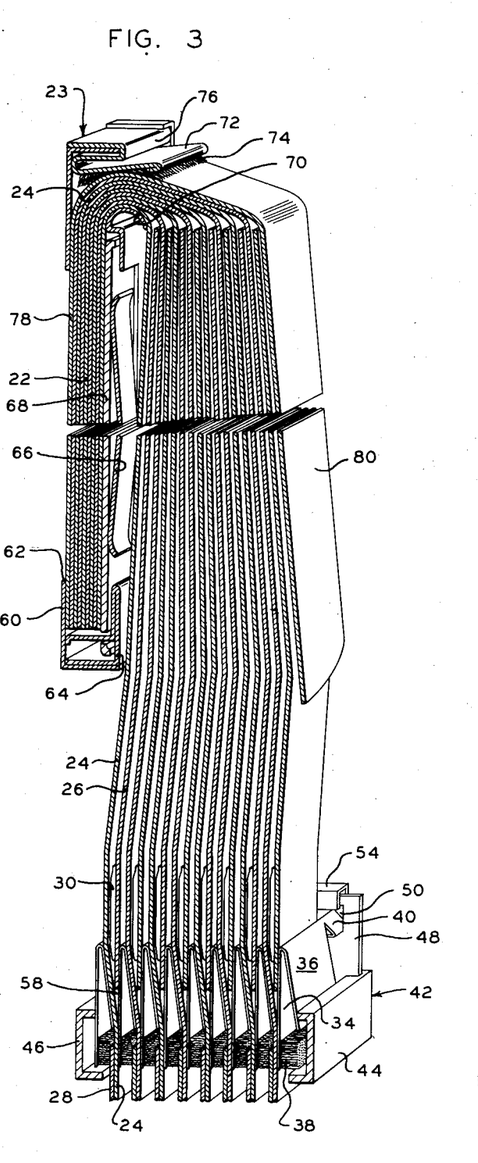
Fig. 3 is a diagrammatic fragmentary perspective sectional view of one of the novel composite products of the present invention.

The novel photographic products for use in such a housing are shown in plan in Fig. 2 and in perspective in Fig. 3, as well as being shown in Fig. 1. They comprise, in a preferred form of the invention, a plurality of photographic film units and associated processing means. Each film unit comprises a photosensitive layer, another layer and a container. A plurality of these photosensitive layers is shown at 22 positioned in a film pack 23. Each photosensitive layer is connected to a leader 24 by a shoulder or tapered portion 25 (shown in Fig. 2). For each photosensitive layer there is provided another layer 26 which is preferably adapted to carry a positive image of a latent negative image created by exposing the photosensitive layer. This other layer is hereinafter referred to as an image-carrying layer 26. Each image-carrying layer has associated therewith a leader 28. As can be seen, the leaders 24 from the photosensitive layers are interleaved with the image-carrying layers. For holding the processing liquid, there is preferably provided with each film unit a container 30 which is capable of releasing its contained liquid through a predetermined edge portion upon the application thereto of a predetermined mechanical stress. This container is preferably adhesively secured to the image-carrying layer 26.

Shown in the lower portion of Fig. 1 is a processing assembly comprising a holder containing a plurality of novel processing members 32 of the present invention. In this preferred form, these members 32 comprise a pair of arms flexibly connected together, preferably being a unitary element shaped in the form of a narrow V. One arm 34 is positioned in a plane parallel to the normal movement of the film unit past the processing member while the other arm 36 of the processing member makes an angle with respect to the arm 34 which may be from approximately 1 to approximately 70 degrees, the smaller angles being preferred in most cases. For furnishing a light seal to an opening defined by a pair of members 32, there is provided a light seal material 38, such as felt, which is preferably adhesively secured to the inner side of the parallel arm 34 of the member 32. The arm 34 is preferably made longer than arm 36 to accommodate this light seal. To maintain the apex of each member predeterminedly spaced from the adjacent apex, there is provided a spacer portion on each processing member. This spacer portion is shown schematically as a turned over shoulder 40 on the end of the member 32 and is, in one form, high enough to allow the container portion of the film unit to enter the processing opening, without applying any pressure to this portion of the unit. This shoulder, as well as predeterminedly spacing the members, also serves to position these members in a holder therefor, this holder being generally indicated by numeral 42.

Certain features of this holder 42 are shown more clearly in Figs. 2 and 3 and it comprises, generally, means for holding the members against lateral and transverse movement and also means for applying a predetermined pressure to the members. For holding the members 32 against movement parallel to, across, or perpendicular to, the withdrawal plane of the film units, there are provided two end plates 48 having a groove 50 therein, in which the shoulders 40 may be placed. This groove is, in one form, just as long as the total thickness of the various shoulders; thus it holds the shoulders against movement perpendicular to the withdrawal plane, this feature being shown most clearly in Fig. 1. For preventing movement of the members 32 in a plane parallel to the withdrawal plane, there is provided a clip 54, one edge of which extends over the edge of the end plate 48 and bears against the top portion (as seen in Figs. 1 and 2) of the shoulder 40. The other end of the clip 54 is preferably secured to the end plate by means such as a slot 52 in the end plate. In a preferred form there is provided a first pressure bar 44 and a second pressure bar 46, which, during assembly of the composite product, are moved toward each other to place the members 32 under a predetermined pressure. In a preferred modification of the invention the two end plates 48 are formed integrally with the pressure bar 46. For the purpose of preventing a light leak around the end of the spreader member holder, there is provided a resilient light seal material on the inner surface of the end portion of pressure bar 44. This light seal is best shown at 56 in Fig. 2.

In a preferred type of film unit, the leaders 24 and 28 associated with the photosensitive and image-carrying layers, respectively, are so arranged that, when they are positioned in the narrowest part of the opening defined by a pair of processing members, they do not present any substantial transverse irregularities in thickness to the pair of processing members. This is preferably accomplished by providing a slot in one leader through which the other leader extends, this slot being positioned in the narrowest part of the processing opening. This feature of the invention, in addition to preventing high pressure points due to transverse irregularities, also halves the effective thickness of the material extending through the processing opening. This feature of the invention is shown most clearly in Figs. 1 and 2, wherein there is provided a slot 58 in the leader 28 associated with the image-carrying layer. As can be seen, the leader 24, from the photosensitive layer 22, is threaded through the slot 58 and the slot is positioned adjacent the outer end of the arm 36 of the spreader member 32. This feature of the invention has particular advantage in maintaining the effective release and spreading pressure on the various members as the film units are withdrawn from the camera. Thus it halves the amount of pressure decrease occasioned as the result of withdrawing a film unit from the stock of leaders and processing members.

In some cases it may be desirable to prevent any pressure decrease as the result of removing a film unit from the assembly. This may be accomplished, in one form of the invention, by providing a spacer member which is associated with the film unit and which may be left in the processing opening after the remainder of the film unit has been withdrawn. Such a member preferably comprises a portion of one of the layers of the film unit and may have associated therewith another element imparting to this portion a greater thickness. This form of the invention is shown diagrammatically in Figs. 1 and 2. In these figures a top portion 27 of the image-carrying layer 26 is shown as having secured thereto an element 29 preferably comprising a strip of cardboard. This cardboard is sufficiently thick so that it resists withdrawal of the image-carrying layer through the processing opening. For providing ease of separation of the top portion 27 from the rest of the image-carrying layer 26, there is preferably provided a weakened portion 31. When the top portion 27 is left in the processing opening it prevents a decrease in pressure on the remainder of the processing elements since it is preferably of the same thickness as the leader 28 which previously occupied this processing opening. This is shown best in Fig. 1.

Referring now to the pack 23 for holding the photosensitive layers, the various features thereof are most clearly shown in Fig. 3. As can be seen, this pack comprises, in a preferred form, a front wall 60 having an exposure opening 62 formed therein. There is also provided a rear wall 64 having a stamped-out portion 66 constituting a spring member. Within the film pack so formed there is positioned a backing plate 68 which is preferably maintained under a predetermined pressure by means of spring 66. The top of the back wall 64 is preferably curled over, as at 70, to provide one side of an antifriction opening through which the photosensitive layers may be withdrawn from the pack. For the purpose of forming with the curved portion 70 a resilient light-sealed opening, there is provided a springy member 72 which may be a continuation of the front wall 60 of the pack or may be suitably secured thereto. The inner surface of this springy member 72 is provided with a light seal material 74. This arrangement of parts provides a light-tight opening through which the photosensitive layers may be withdrawn from the pack and which is capable of maintaining this light-tightness until all of the photosensitive layers are withdrawn. The pack is preferably provided with a shoulder 76 at the top thereof whose function is described in more detail hereinafter.

In order that the composite photographic product shown in Fig. 3 may be handled in daylight, there is preferably provided in the front portion of the pack 23 an opaque cover layer 78 having a tab 80 secured thereto. This cover layer 78 can be removed from the pack to permit exposure of the foremost photosensitive layer therein after the pack 23 has been inserted in the forward portion of the housing. If desired, the leader 80 for withdrawing the cover layer 78 may be extended through one of the processing openings to permit the withdrawing of the cover layer 78 after the housing has been completely closed.

In assembling the composite photographic product of the type described above, and shown most clearly in Fig. 3, the photosensitive layers with their associated leaders 24 and the cover layer 78 are placed within the pack 23, the leaders extending to the rear thereof. Next there is interleaved with each leader 24 an image-carrying layer 26. The pod 30, secured to the image-carrying layer, faces that side of leader 24 corresponding to the emulsion side of the photosensitive layer. The leaders 24 are threaded through the respective slots 58 in the leaders 28 associated with each image-carrying layer. In a preferred form of the invention, a composite assemblage thus formed is operatively associated with a processing assembly comprising the holder 42 carrying the plurality of processing members 32. This is preferably accomplished by having the holder 42 so arranged that the pressure bar 44 is in a non-pressure-applying position, or is completely removed from the holder. Thus, the various processing members 32 are under no compression. The various leaders are then passed through their respective openings between the processing members 32, and the previously inoperative pressure bar 44 is then clamped down to apply a predetermined pressure to the whole stack of processing members 32. This pressure bar is then fixedly secured to the holder such as by soldering or crimping in a portion thereof. The holder 42 with its associated processing members then firmly frictionally engages the various leaders passing therethrough and is sufficiently tightly held to these leaders so as to form a unitary product which can be handled, with only reasonable care, without danger of dislodging the various elements of the assemblage.

As mentioned previously, the housing 10 has a portion 18 for receiving the film pack 23 and another portion 20 for maintaining the processing members within an opening from the housing. In a preferred embodiment of the housing, (shown in Fig. 1) portion 18 comprises a front plate 82 having an exposure opening therein. A bottom portion 84 of the plate 82 is turned inwardly and upwardly to provide a U-shaped channel in which the bottom of the pack 23 may fit snugly. The plate 82 is also provided with an inwardly bent top flange 86 to assist in holding the pack 23 in position. For maintaining the pack 23 flat against the plate 82 there is provided a resilient stop 88 mounted on the cover 14 of the housing. This resilient stop is so designed that, when the cover 14 is in its closed position, the stop resiliently engages the shoulder 76 and holds the pack 23 tightly against the front plate 82, thus positioning the foremost photosensitive layer in the focal plane of the camera.

For maintaining the processing assembly in fixed position in the lower part of the housing within an opening therefrom, there is provided an inwardly turned flange 90 on the front wall 12. Cooperating with this flange is a shoulder 92 mounted on the inner side of the front wall 12, the distance between the flange 90 and the shoulder 92 being preferably equal to the width of the pressure bar 46. A similar flange 94 is provided on the rear cover 14, as is also a resilient shoulder 96, the spacing between the flange 94 and the resilient shoulder 96 being equal to the thickness of the pressure bar 44. These two flanges and two shoulders thus maintain the pressure members rigidly secured within the opening which remains when the cover 14 is closed. Additional flanges (not shown) may also be provided on the sides of the housing, primarily to assure the light-tightness of the opening.

For securing the housing 10 to a camera, there is provided a double-walled flange portion 98 spaced from the front wall 12 of the housing. This flange 98 is adapted to fit in a groove formed in the back of a camera. For permitting removal of the housing 10 from a camera while the housing contains photosensitive layers, there is provided a dark slide 100. This dark slide 100 is preferably positioned within the double-walled flange portion 98 of the housing. Suitable light seal material 102 may be provided adjacent the point of withdrawal of the dark slide 100. Such a housing is particularly adaptable for use on a camera for copying a photograph, or the like. In this case, the dark slide may be removed and a photograph inserted in place of the dark slide. With such an arrangement the image side of the photograph is preferably placed next to the foremost photosensitive layer. The camera shutter is then opened wide and the camera is pointed at a uniform source of light, such as the sky, thus creating a latent negative image of the photograph in the foremost photosensitive layer.

For holding the rear cover 14 closed there is preferably provided an engaging flange 104 mounted on the side wall 15 of the housing. Associated with the cover is a catch 106, resiliently pressed outwardly by a spring 108, and adapted to engage flange 104.

In a preferred modification of the invention the housing is preferably formed of metal or heavy cardboard. The film pack 23 is formed of metal, paper or cardboard. The spreader members 32 are, in a preferred modification of the invention, formed of springy metal, such as steel, which is capable of maintaining its springiness over long periods of time when stored under compression. The photosensitive layers 22 are preferably formed of a silver halide emulsion coated upon an opaque paper base, the leaders 24 being formed integrally with this base. The image-carrying layers 26 are preferably formed of paper such as baryta paper having a white surface and being opaque to actinic light. The containers 30 are preferably formed of a single fold of a paper-backed metal foil coated on its inner surface with an alkali-inert resin such as polyvinyl butyral. The end seals of the container are preferably formed by heat sealing the polyvinyl butyral lining to itself while the edge seal is formed by interposing a layer of ethyl cellulose and then heat sealing. The liquid composition in the container 30 preferably comprises a strongly alkaline viscous aqueous solution of a developer and a silver halide solvent.

In the use of the modification of the invention shown in Figs. 1 through 3, the novel composite product of the present invention, as shown in Fig. 3, is inserted in the housing as shown in Fig. 1. This is preferably accomplished by first placing the film pack in the channel-shaped flange 84 and then pressing the top of the film pack flat against the front plate 82. The cover layer 78 may then be removed by pulling the leader 80. The spreader bar 46 associated with the processing assembly is then placed between the inwardly turned flange 90 and the shoulder 92 on the inner surface of the front wall 12 of the housing. The rear cover of the housing is then pushed to a closed position, thus rigidly supporting the film pack and the processing assembly.

Exposure of the topmost photosensitive layer in the pack 23 is accomplished by removing the dark slide 100 and operating the camera shutter. The user of the camera then pulls the leader 24 until increased resistance to pulling indicates that the shoulder 25 has engaged the edges of the slit 58 in the leader from the image-carrying layer. At this point in the operation of the invention, the image-carrying layer and the photosensitive layer are in face-to-face engagement with the container positioned therebetween. The user of the camera may then take another picture or process the first one. To do the latter, he engages both leaders and pulls the unit, thus assembled, through the processing opening defined by a pair of processing members 32. As the container portion of the film unit passes under the point of the angularly extending arm 36 this arm builds up an increased hydraulic pressure in the container to cause the release of the liquid from the trailing edge of the container. Further movement of the film unit through the processing opening causes the angularly extending arm 36 to spread the liquid composition in a uniform thin film between the photosensitive layer and the image-carrying layer, thus laminating these two layers together. When the element 29, associated with the top portion 27 of the image-carrying layer 26, reaches the processing opening it increases the resistance to withdrawal. The user of the camera then tears the image-carrying layer along the weakened portion 31, thus leaving the portion 27 thereof in the processing opening.

When a preferred liquid composition is employed, the developer develops the latent negative image created by the exposure of the photosensitive layer and the silver halide solvent forms soluble silver complexes with the undeveloped silver halide and transfers these complexes to the image-carrying layer where they are converted to a visible positive image of the latent negative image. When this process is completed, which may take from a few seconds to a few minutes, the photosensitive layer is separated from the image-carrying layer to reveal the final positive image on the surface of the latter layer.

The type of spreader member shown in Figs. 1 through 3 has certain definite advantages. It can be punched or stamped from a continuous strip of stock, it may be made to close tolerances during manufacture, and may be maintained for long periods of time in its operative position. It requires very little space and is simple to assemble in the holder therefor. During use, it is capable of applying a highly concentrated pressure to the container portion of the film unit due to the sharp end on the angular arm 36, while it exerts a very low frictional force on the paper passing thereby. The flexibility of the two arms allows considerable transverse flexing of the angular arm, to compensate for irregularities in paper thickness of the film unit, and to thus maintain a substantially uniform pressure transversely of the film unit as it is withdrawn. This flexibility also allows the blade to be deflected quite easily as the leading edge of the container enters the narrowest portion of the opening, thus preventing the application of a sliding stress to the bond between the container and the image-carrying layer. When the members have a low spring rate, i. e., one in the neighborhood of 100 to 200 pounds per inch, the decrease in pressure of the individual spreaders, as a result of removing film units, is minimized.

Figure 4:
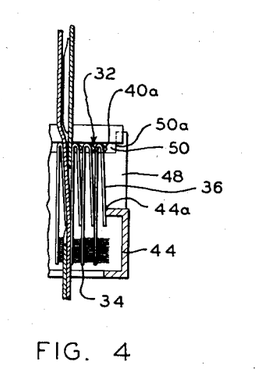
Fig. 4 is a diagrammatic fragmentary cross-sectional view of a modified form of processing member and holder therefor.

When very flat angles in the neighborhood of 1 to 5 degrees are used, the inherent resilience of the stack of members allows the members to maintain a substantially uniform unit pressure throughout the stack of members as the film units are removed. With such flat angles it has been found that, as one film unit is removed, the angle on the remaining angular arms increases just enough to compensate for the loss in thickness of the stack. Thus, although the total pressure applied by the angular arm decreases, the area of contact is decreased, thereby maintaining the unit pressure substantially the same. This feature of the invention is shown in Fig. 4 where like numbers correspond to like elements of Figs. 1 through 3. As shown in Fig. 4, there are provided a plurality of processing members 32 each having an angularly extending arm 36 and a parallel arm 34. Shoulders 40a on the members 32 fit in groove 50 in the end plate 48 of the holder. As can be seen, there is a space between the right-hand shoulder 40 and the end 50a of the groove 50. The pressure bar 44 exerts a predetermined pressure by the point 44a on the arm 36 of one of the processing members.

In the use of the modification of the invention shown in Fig. 4, as the container part of the film unit starts between a pair of processing members, it causes these members to separate. This separation is possible due to the fact that the right-hand member 32 in the stack is supported at point 44a and is free to pivot around this point, thus allowing the top portion of all members to the right of the container to move. As the container moves between the pair of members this separation of the members continues until the shoulder 40 of the right-hand member 32 engages the end 50a of the groove 50. Further movement of the container causes the members to realign themselves and to exert a high unit pressure on the container as it comes under the free end of arm 36.

When the film unit is completely removed, the decrease in pressure of the stack causes all of the angular arms 36 to increase their angle with respect to the other arms 34. Thus, although the total pressure on the succeeding containers is lessened, the unit pressure remains substantially the same due to the decreased area of contact between the angular arms 36 and their respective film units.

There is thus provided, by the modification of the invention shown in Fig. 4, a plurality of processing members which can be stacked in a very small space, thus reducing the size of a housing therefor to the absolute minimum, this size being less than the total thickness of a plurality of film units at their container portions. This form also provides an automatic compensation for decreases in total pressure on the stack as the film units are withdrawn.

This feature of the invention depends upon the balancing of certain factors. In general, it may be said that for best results the angle made by one arm with respect to the other arm should be quite flat, i. e., in the neighborhood of one to five degrees in the compressed state. The above angles are based upon the use of relatively flexible paper materials for the image-carrying and photosensitive layers. These angles are also the most satisfactory for use with a highly viscous liquid composition which is to be spread in a very thin layer.

In the modifications of the spreader members shown in Figs. 1, 3 and 4, the arms thereof are straight. While this is a preferred form it is feasible to employ a curved or bent arm, that is, an arm whose angle with respect to the other arm of the member varies from the apex to the end of the arm. This last form of the invention may be preferred in those cases where a high effective angle between the arm and the film unit is desired and a minimum of space is essential. It is also advantageous in those cases where a high spring rate is desired.

While the invention has been described in connection with the preferred photochemical process it is not limited thereto and the processing liquid utilized may only develop or develop and fix a negative with no emphasis on the production of a positive image. Similarly, the photosensitive layer may comprise a diazonium, ferric salt, or lead halide photosensitive substance.

While the various modifications of the invention have been described in their preferred forms, i. e., as novel housings and composite photographic products for use with a camera having a lens, it is contemplated that the invention may be employed in other devices having no lens or shutter.

Since certain changes may be made in the above product and apparatus without departing from the scope of the invention herein involved, it is intended that all matter contained in the above description or shown in the accompanying drawings shall be interpreted as illustrative and not in a limiting sense.

What is claimed is:

1. A photographic film pack comprising a plurality of film units, each said film unit comprising a first layer including a predetermined area of a photosensitive material, another layer, and a container releasably holding a liquid, each of said layers having associated therewith a leader, one of said leaders having a slit therein, the other of said leaders extending through said slit, and means defining a plurality of elongated processing openings, there being one processing opening for each said film unit, each said film unit being arranged with respect to its associated processing opening so as to be withdrawn therethrough in a predetermined plane after exposure of said photosensitive area, said means comprising pairs of members capable of applying a liquid releasing and spreading stress to said film unit, at least one of said members comprising two arms having surfaces parallel to the long dimension of said opening and being adapted to move with respect to each other, at least one of said arms extending at an angle to said withdrawal plane, the other of said arms being substantially parallel to said withdrawal plane, said angular arm of one member and said parallel arm an adjacent member defining said opening, and a holder for said members, said members being under a predetermined pressure in said holder, said leaders from a film unit extending through the processing opening for their film unit, said slit being positioned in the narrowest portion of said opening, whereby the effective thickness of said two leaders at said slit portion is no greater than the thickness of one of said leaders, said pressure being sufficient to create a frictional bond between said leaders and said members to hold said members against accidental dislodgment during handling of said film pack.

2. A photographic product comprising at least one film unit, said film unit comprising a first layer including a predetermined area of a photosensitive material, a second layer, a leader and a container releasably holding a processing liquid, said container, said layers and said leader being associated so as to permit said layers to be superposed with said container therebetween, a magazine for holding at least said first layer, means defining an exposure opening in said magazine, and means defining an elongated processing opening, said film unit being adapted to be withdrawn from said magazine and through said processing opening in a predetermined plane, said leader extending through said processing opening, said last-named means comprising a pair of members capable of applying a liquid releasing and spreading stress to said film unit, at least one of said members comprising a V-shaped member having two arms having surfaces parallel to the long dimension of said processing opening, at least one of the arms of said V-shaped member having sufficient resilience to apply a resilient pressure to said film unit as said unit moves past said arm, the apex of said V-shaped member extending toward the interior of a camera housing adapted for use of said product, one of said arms being longer than the other of said arm and having on at least one surface thereof a light-seal material extending substantially along said processing opening.

3. A photographic film pack comprising a plurality of film units, each said film unit comprising a first layer including a predetermined area of a photosensitive material, another layer, and a container releasably holding a liquid, at least one of said layers having associated therewith a leader, and means defining a plurality of elongated processing openings, there being one processing opening for each of said film units, each said film unit being arranged with respect to its processing opening so as to be withdrawn therethrough in a predetermined plane after exposure of said photosensitive area, said means comprising pairs of members capable of applying a liquid releasing and spreading stress to said film unit, at least one of said members comprising a V-shaped member having two arms having surfaces parallel to the long dimension of said opening and resiliently mounted with respect to each other, at least one of said arms extending at an angle to said withdrawal plane, the other of said arms being substantially parallel to said withdrawal plane, said angular arm of one member and said parallel arm of an adjacent member defining said opening, a shoulder on said member at the apex of said V, a holder for said members, a portion of said holder defining a space permitting a predetermined amount of movement of said shoulders in a plane substantially perpendicular to the withdrawal plane, and means for applying a predetermined pressure to said members to compress said arms of said members to a predetermined angle, said last-named means operating upon said arms at a point spaced from said shoulders, whereby said shoulders are free to move in said space when said members are under compression, said leaders from said film units extending through the processing openings for their film units, said pressure being sufficient to create a frictional bond between said leaders and said members to hold said members against accidental dislodgment during handling of said film pack.

4. A photographic product comprising at least one film unit, said film unit comprising a first layer including a predetermined area of a photosensitive material, a second layer, a leader and a container releasably holding a processing liquid, said container, said layers and said leader being associated so as to permit said layers to be superposed with said container positioned between outer surfaces of said superposed layers, a magazine for holding at least said first layer, a back wall in said magazine, said back wall having a curved top portion, a front wall in said magazine, a resilient portion associated with said front wall and defining an opening with said curved top portion of said back wall, a light-seal material associated with one of said portions, means defining an exposure opening in the front wall of said magazine, and means outside of said magazine defining an elongated processing opening, portions of said film unit extending outside of said magazine and being frictionally attached to said last-named means to connect the latter to said magazine, said first layer of said film unit being arranged to be withdrawn from said magazine and through said processing opening in a predetermined plane, said last-named means comprising a pair of members capable of applying a liquid releasing and spreading stress to said film unit, at least one of said members comprising a V-shaped member having two arms having surfaces parallel to the long dimension of said processing opening, at least one of the arms of said V-shaped member having sufficient resilience to constitute a resilient pressure-applying means, the apex of said member extending toward the interior of a housing for said product, the portions of said film unit frictionally engaging said opening-defining means holding the latter against accidental dislodgment.

5. A photographic processing means for insertion in a camera or magazine and adapted to furnish a plurality of light-tight elongated withdrawal openings for processing film units containing a releasable liquid, said means comprising a plurality of pairs of processing members capable of applying a liquid releasing and spreading stress to said film units, at least one of said members of a pair comprising two arms having surfaces parallel to the long dimension of said openings and resiliently mounted with respect to each other, one of said arms extending at an angle to the other of said arms, an arm of one member and an arm of an adjacent member defining one of said openings, said two arms defining said opening being at an angle to each other, a holder for said members, a shoulder on each end of each of said members, means defining a slot in said holder for receiving said shoulders, means associated with said holder for applying a predetermined pressure to said members, a light-seal material associated with one of said arms and extending along said opening, and other light-seal material associated with said holder adjacent the ends of said members.

6. A photographic processing means for insertion in a camera or magazine and adapted to furnish a plurality of light-tight elongated withdrawal openings for processing film units containing a releasable liquid, said means comprising a plurality of pairs of processing members capable of applying a liquid releasing and spreading stress to said film units, at least one of said members of a pair comprising two arms having surfaces parallel to the long dimension of said openings and resiliently mounted with respect to each other, one of said arms extending at an angle to the other of said arms, an arm of one member and an arm of an adjacent member defining one of said openings, said two arms defining said opening being at an angle to each other, a shoulder on each end of each of said members, a holder for said members, said holder comprising a pair of end plates, means defining slots in said end plates, said slots being equal in length to the total thickness of said shoulders, a clip associated with each end plate serving to hold said shoulders against relative motion in a direction perpendicular to the length of said slots, and means associated with said holder for applying a predetermined pressure to said members.

7. A photographic processing means for insertion in a camera or magazine and adapted to furnish a plurality of light-tight elongated withdrawal openings for processing film units containing a releasable liquid, said means comprising a plurality of pairs of processing members capable of applying a liquid releasing and spreading stress to said film units, at least one of said members of a pair comprising two arms having surfaces parallel to the long dimension of said openings and resiliently mounted with respect to each other, one of said arms extending at an angle to the other of said arms, an arm of one member and an arm of an adjacent member defining one of said openings, said two arms defining said opening being at an angle to each other, a shoulder on each end of each of said members, a holder for said members, said holder comprising a pair of end plates, means defining slots in said end plates, said slots being equal in length to the total thickness of said shoulders, a clip associated with each end plate serving to hold said shoulders against relative motion in a direction perpendicular to the length of said slots, and means associated with said holder for applying a predetermined pressure to said members, said last-named means comprising a pair of pressure bars one of which is movable towards the other.

8. A photographic product comprising at least one film unit, said film unit comprising a first layer including a predetermined area of a photosensitive material, a first leader associated with said first layer, a second layer, a second leader associated with said second layer and a container releasably holding a processing liquid, said container, said layers and said leaders being associated so as to permit said layers to be superposed with said container positioned between outer surfaces of said superposed layers, a magazine for holding at least said photosensitive area of said first layer, and means defining an elongated processing opening having a long dimension at least as great as the width of said first layer and through which said superposed layers of said film unit are arranged to be withdrawn in a predetermined path after exposure of said photosensitive area, both said leaders extending through said processing opening, said means comprising a pair of members, at least one of said members comprising two arms defining surfaces parallel to said long dimension of said opening, a first of said arms being resiliently mounted for movement with respect to the other of said arms, said first arm extending at an angle to said withdrawal path and being spaced from said other member by a distance less than the total thickness of said two superposed layers and container, said two members frictionally engaging and attaching together said two leaders so as to maintain said layers, said leaders, said container, said magazine and said members in assembled relationship, said pair of members operating to apply a liquid releasing and spreading pressure to said film unit upon withdrawal of said unit therebetween.

9. A photographic product comprising at least one film unit, said film unit comprising a first layer including a predetermined area of a photosensitive material, a first leader connected to said first layer, a second layer, a second leader connected to said second layer and a container releasably holding a processing liquid, one of said leaders extending through a slot in the other leader, said container, said layers and said leaders being associated so as to permit said layers to be superposed with said container positioned between outer surfaces of said superposed layers, a magazine for holding at least said photosensitive area of said first layer, and means located outside said magazine defining an elongated processing opening having a long dimension at least as great as the width of said first layer and through which said superposed layers of said film unit are adapted to be withdrawn after exposure of said photosensitive area, portions of said film unit extending outside of said magazine and being frictionally attached to said last-named means to connect the latter to said magazine, said leader extending through said opening, said means comprising a pair of members capable of applying a liquid releasing and spreading pressure to said film unit, one of said members comprising two arms having surfaces substantially parallel to said long dimension of said opening and resiliently mounted for movement of one of said surfaces with respect to the other of said surfaces, a first of said arms being arranged so as to extend at an angle to said layers as they are withdrawn through said opening, a surface on said other member being arranged so as to have a portion which is substantially parallel to said layers during withdrawal, said angularly extending arm of one member being spaced from said surface of said other member by a distance less than the total thickness of said two superposed layers and container, said slot being positioned in the narrowest portion of the processing opening defined by said two members.

10. A photographic film pack comprising a plurality of film units, each said film unit comprising a first layer including a predetermined area of a photosensitive material, a second layer, a leader and a container releasably holding a processing liquid, said container, said layers and said leader being associated so as to permit said layers to be superposed with said container positioned between outer surfaces of said superposed layers, a magazine for holding at least said photosensitive areas of said film units, and means outside of said magazine defining a plurality of processing stations, portions of said film units extending outside of said magazine and being frictionally attached to said last-named means to connect the latter to said magazine, there being one processing station for each said film unit, each said film unit being arranged with respect to its associated processing station so as to be withdrawn therepast in a predetermined path after exposure of said photosensitive area and superpositioning of said two layers thereof, each said processing station being defined by a pair of members, each said leader extending between the pair of members defining the processing station for its film unit, at least one of said members of a pair comprising two arms having surfaces resiliently mounted with respect to each other, at least one of said arms extending at an angle to said withdrawal path, the other of said arms being substantially parallel to said withdrawal path, said angular arm of one member being angularly related to a surface of said other member of a pair and being spaced therefrom by a distance less than the total thickness of the two superposed layers and container of its associated film unit and being capable of applying a liquid releasing and spreading pressure to said film unit.

11. A photographic film pack comprising a plurality of film units, each said film unit comprising a first layer including a predetermined area of a photosensitive material, a second layer, a leader and a container releasably holding a processing liquid, said container, said layers and said leader being associated so as to permit said layers to be superposed with said container positioned between outer surfaces of said superposed layers, a magazine for holding at least said photosensitive areas of said film units, means outside of said magazine defining a plurality of elongated processing openings, portions of said film units extending outside of said magazine and being frictionally attached to said last-named means to connect the latter to said magazine, there being one processing opening for each said film unit, each said film unit being arranged with respect to its associated processing opening so as to be withdrawn therethrough in a predetermined path after exposure of said photosensitive area and superpositioning of said two layers thereof, each said leader extending through its associated processing opening, said means comprising pairs of members capable of applying a liquid releasing and spreading stress to said film unit, each of said members comprising two arms having surfaces parallel to the long dimension of said opening and resiliently mounted with respect to each other, at least one of said arms of each member extending at an angle to said withdrawal path, the other of said arms being substantially parallel to said withdrawal path, said angular arm of one member and said parallel arm of an adjacent member being spaced apart less than the total thickness of the two superposed layers and container of its associated film unit and defining said processing opening, and a holder for said members, said members being under a predetermined pressure in said holder.

12. A photographic film pack comprising a plurality of film units, each said film unit comprising a first layer including a predetermined area of a photosensitive material, another layer and a container releasably holding a liquid, each of said layers having a leader associated therewith, a magazine for holding at least said photosensitive areas of said film units, and means outside of said magazine defining a plurality of elongated processing openings, portions of said film units extending outside of said magazine and being frictionally attached to said last-named means to connect the latter to said magazine, there being one processing opening for each of said film units, each said film unit being arranged with respect to its associated processing opening so as to be withdrawn therethrough in a predetermined path after exposure of said photosensitive layer and superpositioning of said two layers thereof, said means defining said openings comprising a plurality of V-shaped members, each of said members comprising two arms having surfaces parallel to the long dimension of said opening and resiliently mounted with respect to each other, and means for holding said members so that at least one of said arms extends at an angle to said withdrawal path and the other of said arms is substantially parallel to said withdrawal path, said angular arm of one member and said parallel arm of an adjacent member defining one of said openings and being capable of applying a liquid releasing and spreading stress to a film unit passing therebetween, said members being under a predetermined pressure in said holding means, said leaders from a film unit extending through the processing opening for their film unit, said predetermined pressure being sufficient to create a frictional bond between said leaders and said members to hold said members against accidental dislodgment during handling of said film pack.

13. A photographic film pack comprising a plurality of film units, each of said film units comprising a first layer including a predetermined area of a photosensitive material, a second layer and a container releasably holding a liquid, said first layer having associated therewith a leader, said container, said layers and said leader of a film unit being associated so as to permit said layers to be superposed with said container positioned between said superposed layers, a magazine for said first layers, means defining a lighttight opening from the magazine through which said leaders for said first layers extend, said means frictionally engaging said leaders, said second layers being positioned outside of said magazine for said first layers and being interleaved with said leaders from said first layer, means defining a plurality of processing openings, there being one processing opening for each of said film units, each said film unit being arranged with respect to its associated processing opening so as to be withdrawn therethrough in a predetermined path after exposure of said photosensitive area and superpositioning of the two layers thereof, said last-named means comprising a plurality of members operable in pairs to define said processing openings therebetween, and a holder for said members outside of said magazine, said holder being free for limited movement with respect to said magazine, said members being under a predetermined pressure in said holder, each said leader from a film unit extending through the processing opening for its film unit, said predetermined pressure being sufficient to create a frictional bond between said leaders and said members to hold said members against accidental dislodgment during handling of said film pack, whereby said leaders from said first layers act to connect said holder to said magazine and said holder prevents dislodgment of said second layers from said film pack, each said pair of members operating to apply a liquid releasing and spreading pressure to the film unit whose leader extends therebetween upon movement of said film unit between said pair of members.

14. A photographic product comprising a first film unit, a second film unit, each film unit including a layer, a predetermined area of which is photosensitive, a leader connected to said photosensitive layer, a second layer, a leader connected to said second layer and a container releasably holding a processing liquid, a magazine holding the photosensitive layers in superposed relation, means defining an exposure aperture in said magazine through which the foremost of said superposed photosensitive layers may be exposed, an opaque shield removably associated with said magazine and normally covering said exposure aperture, means defining a passage in said magazine through which said photosensitive layers are separately withdrawable, the leader of each said photosensitive layer extending through said passage exteriorly of said magazine, a holder outside of said magazine, and a plurality of members mounted in said holder, a portion of said first film unit outside said magazine, including one of the leaders thereof, extending between a first pair of said members in said holder, a portion of the second film unit outside said magazine, including one of the leaders thereof, extending between a second pair of members in said holder, said extending portions of each said unit being frictionally held by said members, said film units being so arranged with respect to said magazine and said members that the layers of each film unit can be withdrawn between that pair of members between which its leader extends with the container of that unit located to release its liquid between said layers, each said pair of members being capable of applying sufficient force to the unit drawn therebetween to cause the container of said unit to release its contents and to effect a spreading of said contents between said layers.

15. A photographic product comprising a first film unit, a second film unit, each film unit including a layer, a predetermined area of which is photosensitive, a leader connected to said photosensitive layer, a second layer, a leader connected to said second layer and a container releasably holding a processing liquid, a magazine holding the photosensitive layers in superposed relation, means defining an exposure aperture in said magazine through which the foremost of said superposed photosensitive layers may be exposed, an opaque shield removably associated with said magazine and normally covering said exposure aperture, means defining a passage in said magazine through which said photosensitive layers are separately withdrawable, the leader of each said photosensitive layer extending through said passage exteriorly of said magazine, a holder outside of said magazine, and a plurality of members mounted in said holder, a portion of said first film unit outside said magazine, including both of the leaders thereof, extending between a first pair of said members in said holder, a portion of the second film unit outside said magazine, including both of the leaders thereof, extending between a second pair of members in said holder, said extending portions of each said unit being frictionally held by said members, said film units being so arranged with respect to said magazine and said members that the layers of each film unit can be withdrawn between that pair of members between which its leaders extend with the container of that unit located to release its liquid between said layers, each said pair of members being capable of applying sufficient force to the unit drawn therebetween to cause the container of said unit to release its contents and to effect a spreading of said contents between said layers.

16. A photographic product comprising at least one film unit, said film unit comprising a first layer including a predetermined area of a photosensitive material, a second layer, a leader and a container releasably holding a processing liquid, said container, said layers and said leader being associated so as to permit said layers to be superposed with said container therebetween, a magazine for holding at least said first layer, means defining an exposure opening in said magazine, means defining an elongated processing opening associated with said unit, said film unit being arranged so that said first layer may be withdrawn from said magazine and said superposed layers moved through said processing opening in a predetermined path, said processing opening having a long dimension at least as great as the width of said first layer, said leader extending through said processing opening, said last-named means comprising a pair of members capable of applying a liquid releasing and spreading pressure to said film unit, at least one of said members comprising a V-shaped member having two arms having surfaces parallel to the long dimension of said opening, at least one of the arms of said V-shaped member having sufficient resilience to apply a resilient pressure to said film unit as said unit moves past said arm, a shoulder on said V-shaped member, and means for holding said two members so that said shoulder engages said other member and maintains the apex of said V-shaped member spaced from said other member by an amount on the order of the total thickness of the two superposed layers and container.

17. The product of claim 16 wherein one of the arms of said V-shaped member is longer than the other arm thereof.

18. A composite photographic product comprising at least one film unit of the type including a photosensitive layer, another layer, a leader secured to one of said layers and a container releasably carrying a processing liquid, processing means associated with said film unit, and a magazine containing at least the photosensitive layer of said unit to provide a light-tight chamber therefor, portions of said unit, including said leader, extending exteriorly of the magazine, said processing means being outside said magazine and being in frictional engagement with the portions of said film unit outside said magazine so as to be held thereby against accidental dislodgment, said processing means comprising at least one member having resiliently connected arms, a first of said arms having a free end extending transversely of said film unit, said free end being adapted to apply a resilient pressure to said unit as said unit is moved past said first arm in a predetermined plane for releasing and spreading said liquid, said container being secured to one of said layers so as to be positioned between said layers when said layers are superposed, said processing means being frictionally attached to said leader, a second of said arms carrying a light seal material on that surface thereof facing said first arm.

OTTO E. WOLFF.

REFERENCES CITED

The following references are of record in the file of this patent:

UNITED STATES PATENTS

| Number | Name | Date |
|---|---|---|
| 471,586 | Whitney | Mar. 29, 1892 |
| 901,200 | Sheppard | Oct. 13, 1908 |
| 1,120,498 | Houghton | Dec. 8, 1914 |
| 1,305,095 | Hansen | May 27, 1919 |
| 1,368,029 | Fawkes et al. | Feb. 8, 1921 |